United States Patent Office 3,440,901
Patented Apr. 29, 1969

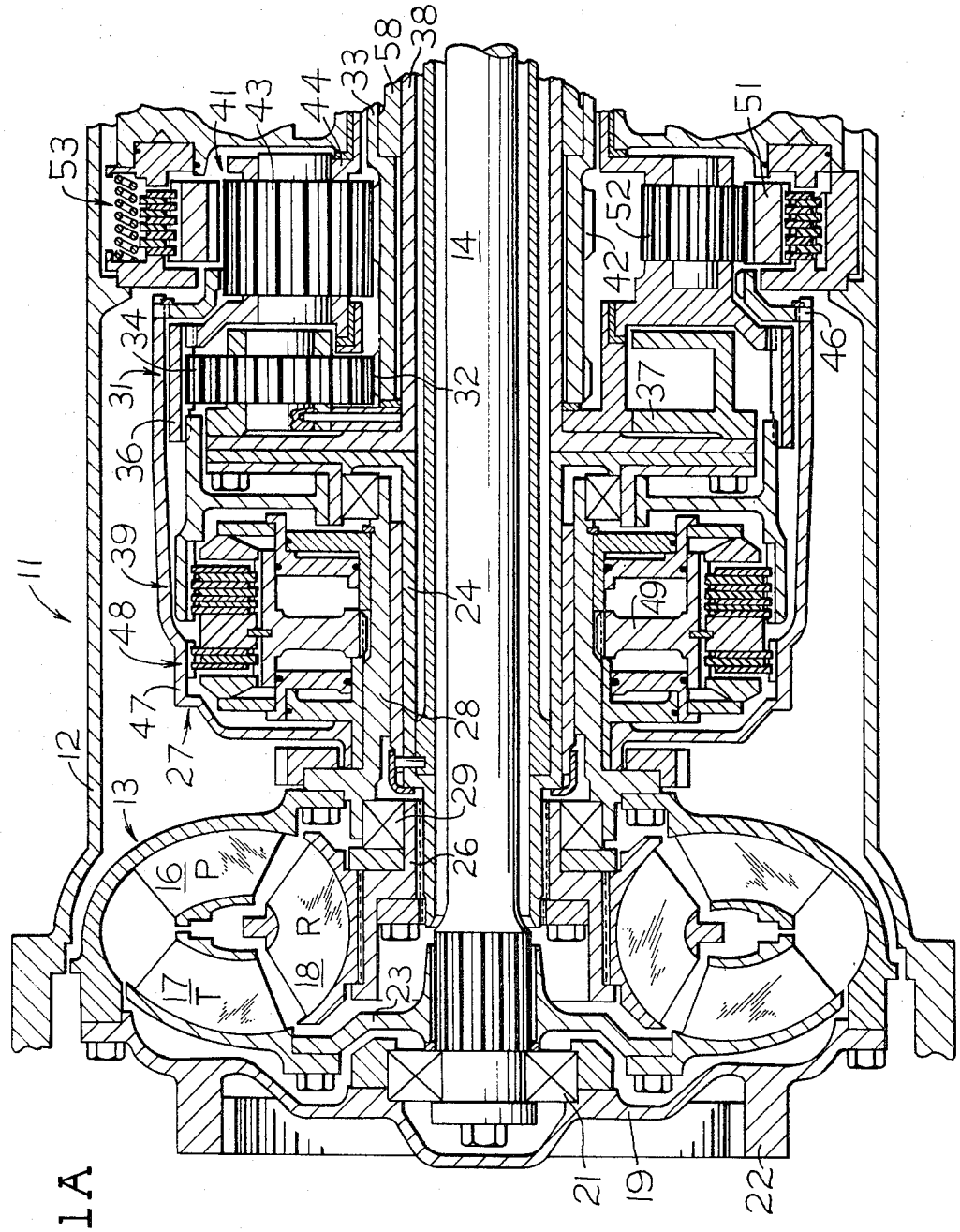

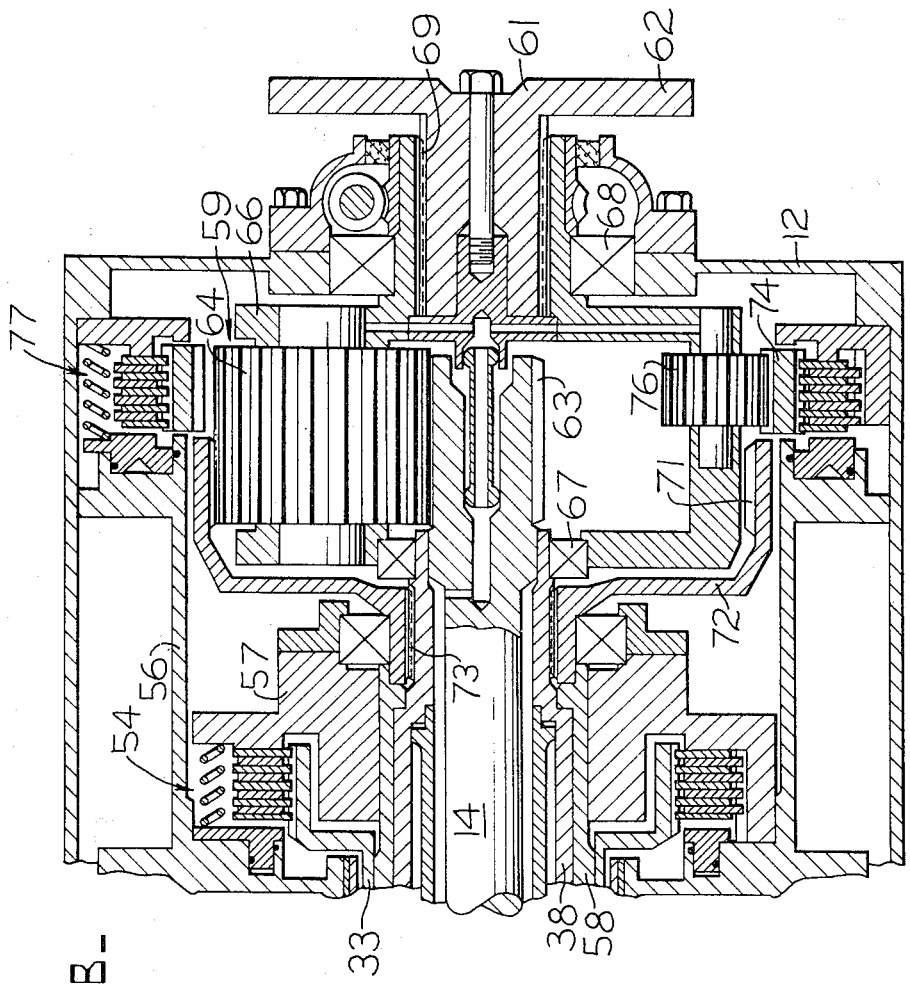

3,440,901
COMPACT BROAD RANGE POWER
TRANSMISSION
Robert O. Chambers, West Medford, Mass., assignor to
Caterpillar Tractor Co., Peoria, Ill., a corporation of
California
Filed July 25, 1967, Ser. No. 655,864
Int. Cl. F16h 47/08
U.S. Cl. 74—677                    7 Claims

ABSTRACT OF THE DISCLOSURE

A split torque power shift drive transmission for vehicles has a power input driving both a three-element torque converter and a stepped gear system with the reactor of the converter being coupled to the output of the stepped gear system. The power path through the gear system is combined, in an output planetary gear train, with a second path through the converter turbine, in an arrangement having relatively few gears, brakes and clutches for the number of speed ranges provided.

Background of the invention

This invention relates to drive transmissions for powered vehicles and the like and more particularly to a power shift transmission which provides for a broad speed range and preferred operating characteristic in a very compact and simple construction.

Vehicle transmission of the constant mesh type require considerable skill and effort on the part of the operator if good performance is to be realized. This is particularly true of highway truck transmissions which may have a large number of speed ranges. The need for repeated skillful shifting is very pronounced when the vehicle is driven over a variable grade or otherwise encounters changing resistance and in situations where the vehicle must be repeatedly stopped and started as in much urban driving. To reduce operator effort and reliance on operator skill, various forms of power shift transmission utilizing fluid torque converters have been developed.

These advantages of the power shift transmission relative to the constant mesh type have resulted in the widespread use of such transmission notwithstanding adverse factors such as greater size, weight, complexity and cost and somewhat greater power losses under non-transient conditions. To more fully realize the benefits of power shift transmissions, it is desirable that these factors be reduced. This is particularly desirable with respect to certain recent designs for trucks and other vehicles in which the space and weight allotment for the transmission may be very restricted. However, it is very difficult to reduce the size or complexity of known power shift transmissions without reducing the available speed ranges or sacrificing other desirable characteristics.

Summary of the invention

This invention relates to a power shift transmission for vehicles and the like which has a very compact and lightweight construction while providing for a broad range of speeds, high efficiency, and other preferred operating characteristics. The transmission utilizes a torque converter, a stepped gearing system, and an output planetary train in an arrangement providing for a large number of forward speeds and reverse with a small number of gears and with relatively few clutches and brakes for effecting shifts between speeds.

Both the converter and the stepped gearing system are driven by the power input from the associated engine and the converter reactor is coupled to the stepped gearing system ouput. This power path combines, in the output planetary train, with another power path from the converter turbine to the planetary train. In one embodiment, this system can be conditioned to provide any of six forward speeds or a reverse speed by means of two rotating clutches and three brakes.

This construction provides an all fluid drive at the lowest forward speed for easy starting under adverse conditions. The fluid drive is modified by supplementary mechanical drive up through progressively higher speeds with the mechanical drive being direct at the highest forward speed.

Accordingly, it is an object of this invention to provide a compact, lightweight and highly efficient power shift transmission providing for a broad speed range and other desirable operating characteristics.

The invention, together with further objects and advantages thereof, will be better understood by reference to the following description of a preferred embodiment in conjunction with the accompanying drawings.

Brief desription of the drawings

In the accompanying drawings:

FIG. 1A is an axial section view of the forward portion of a transmission embodying the invention;

FIG. 1B is a similar axial section view of the rearward portion of the transmission shown in FIG. 1A, FIGS. 1A and 1B being in effect a single view of the tranmission.

Description of a preferred embodiment

Figure 2:
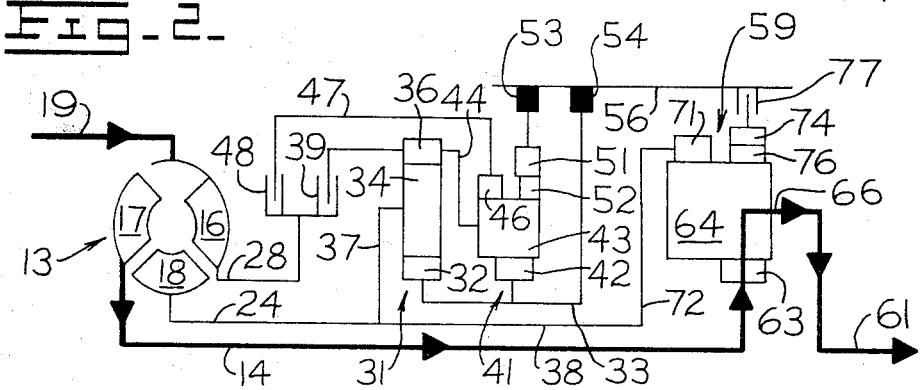
FIGS. 2 to 8 are schematic diagrams of the transmission shown in FIGS. 1A and 1B showing the power paths therethrough which provide for, respectively, the first through sixth forward speeds and the reverse speed setting.

Referring now to the drawing and more particularly to FIGS. 1A and 1B in combination, the transmission 11 has a housing 12 with a three-element fluid torque converter 13 situated at the forward end thereof, the converter being coaxial with a turbine output shaft 14 which extends axially within the housing. Converter 13 may be of conventional construction and includes a pump 16, turbine 17 and reactor 18.

Considering now the connections to the torque converter 13, the pump 16 thereof is driven through a circular member 19 situated dowwardly from the converter and journalled to output shaft 14 by a bearing 21 at the forward end thereof. A series of drive lugs 22 extend from the forward face of member 19 to engage with an engine flywheel or other means for driving the transmission 11. Member 19 thus constitutes the power input to the transmission 11. The converter turbine 17 is drivingly coupled to the turbine output shaft 14 by an annular member 23 while the converter reactor 18 is coupled to a step gearing system output shaft 24, which is coaxial with turbine output shaft 14, by means of an annular member 26.

To provide for selecting the different speed ratios of the transmission 11, a step gearing system 27 is situated rearwardly from the converter 13 in coaxial relationship therewith. The drive input to the step gears 27 is through a quill shaft 28 coupled to the pump 16 of the torque converter 13 and thus to the transmission drive input member 19. Quill shaft 28 is coaxial with shafts 24 and 14 and a bearing 29 is disposed between the forward end of the quill shaft and the reactor coupling member 26.

Step gearing system 27 has a first planetary gear set 31 with a sun gear 32 formed integrally on a shaft 33, a series of planetary gears 34 and a ring gear 36. Planet gears 34 are mounted on a carrier 37 which is part of an additional shaft 38. Shaft 38 is in turn coupled to the shaft 24 from converter reactor 18. The ring gear 36 is selectively couplable to the power input to transmission 11 through a first rotating clutch 39 which when actuated couples the ring gear to quill shaft 28. The stepped gearing system 27 has a second planetary gear set 41 which is of the compound type and which has a sun gear 42 also formed integrally on shaft 33 so that the sun gears of the two planetary gear sets 31 and 41 are coupled for synchronous rotation. Planetary gear set 41 has planet gears 43 mounted on a carrier 44 which is coupled to the ring gear 36 of the first planetary gear set 31. A first ring gear 46 of gear set 41 is selectively connectable to the transmission power input through an annular member 47 which extends forwardly and which may be coupled to quill shaft 28 through another rotating clutch 48. Clutch 48 is situated forwardly from clutch 39 in coaxial relationship therewith and couples to the quill shaft 28 through an annular member 49 which also connects the first clutch 39 therewith.

A second ring gear 51 is also associated with the compound planetary gear set 41 and engages the planetary gears 43 through a set of idler gears 52. Ring gear 51 may be selectively locked against rotation by actuating a brake 53 situated between the ring gear and transmission housing 12.

As shown in FIG. 1B in particular, the selection of different speed ranges is further provided for by an additional brake 54 which, when actuated, locks shaft 33 and thus the sun gears of both planetary gear sets 31 and 41, to the transmission housing 12 through a cylindrical member 56 which is fixed against rotation relative to the housing. The brake 54 acts between cylindrical member 56 and an annular element 57 fixed thereto which is coaxial with the stepped gearing system output shaft 38. A coaxial sleeve 58 serves to support shaft 33.

Torque which is transmitted through the step gearing system 27 is combined with torque transmitted between the converter reactor 18 and the step gearing system output shaft 38 as previously described to define a first power path through the forward section of the transmission, the second power path being through the turbine 18 and turbine output shaft 14. These two power paths are in turn combined in an output planetary gear train 59 which drives a transmission output shaft 61 having a flange 62 for coupling a vehicle drive line or other mechanism operated through the transmission. Output planetary gear train 59 is of the compound type and has a sun gear 63 formed by teeth which are integral with the rearward end of turbine output shaft 14. A set of planetary gears 64 orbit about sun gear 63 on a carrier 66 journalled at the front end by a bearing 67 which is coaxially disposed on the end of the stepped gearing system output shaft 38. The back end of carrier 66 extends through a bearing 68 mounted in the endwall of the transmission housing 12 and drives output shaft 61 through a spline connection 69 therewith. Planet gears 64 also engage with a first ring gear 71 driven through an annular member 72 through a spline connection 73 to the rearward end of stepped gearing system output shaft 38. The planet gears 64 also indirectly engage with a second ring gear 74 through a series of idlers 76 mounted on the planet carrier. To provide for reverse drive as will hereinafter be described in more detail, the second ring gear 74 may be selectively locked to the transmission housing 12 by actuation of an additional brake 77 disposed therebetween.

Considering now the operation of the transmission 11, the six forward speeds and single reverse speed are obtained by actuating selected pairs of the above described clutches and brakes, by means of mechanisms known to the art, as set fourth in the following chart:

| Speed: | Actuated clutches or brakes |
|---|---|
| 1st (forward) | 53 and 54 |
| 2nd | 48 and 53 |
| 3rd | 39 and 53 |
| 4th | 48 and 54 |
| 5th | 39 and 54 |
| 6th | 39 and 48 |
| Reverse | 54 and 77 |

Referring now to FIG. 2, the engagement of brakes 53 and 54 to establish the first speed foward causes the reactor 18 of the torque converter 13 and all components of the first two differential gear sets 31 and 41 to be held stationary. Consequently, only a single active power path is present at this time. In particular, input torque is transmitted from pump 16 to turbine 17 and then through the turbine output shaft 14 to the sun gear 63 and planet carrier 66 of the output differential gear train 59. Thus, in the first speed forward a strictly fluid drive is provided with the output differential gear train 59 functioning as a reduction gearing therefor.

Figure 3:
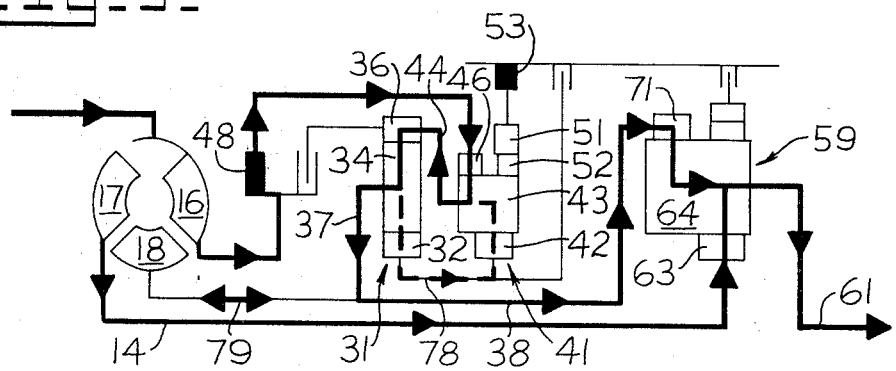

Referring now to FIG. 3, the actuation of clutch 48 and brake 53 to obtain the second forward speed activates the mechanical power path which supplements the fluid drive power path through turbine 17 and shaft 14 to the output coupling differential gear train 59 as described above. In particular, power is transmitted from pump 16 through clutch 48 to ring gear 46 of gear set 41. From gear set 41 the power is transmitted through carrier 44 to ring gear 36 of gear set 31 and from the carrier 37 thereof to shaft 38. Shaft 38 in turn drives the ring gear 71 at the output differential gear train where the power recombines with that of the fluid drive path and is delivered to the output shaft 61. The speed differential relative to the first speed forward is produced in that the planets 43 and 52 of gear set 41 walk about the associated ring gear 51 and thereby modify the angular speed of the planets 64, which drive the transmission output shaft 61, at the output differential gear train 59. It will be noted that power recirculates from the sun gear 32 of gear set 31 to the sun gear 42 of gear set 41 as indicated by dashed line 78 at this gear setting. Further, the direction of power flow reverses as the converter passes through the 1:1 torque ratio condition as indicated by the double arrow 79.

Figure 4:
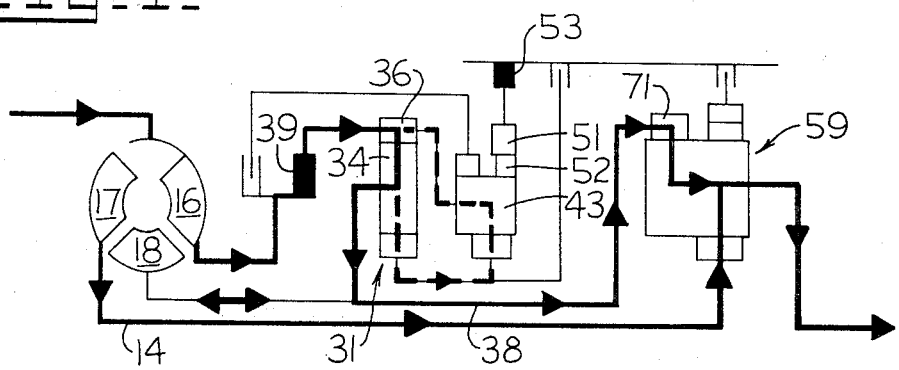

Referring now to FIG. 4, a third forward speed is obtained by engaging clutch 39 and brake 53 thereby causing planet gears 43 and the associated idler gears 52 to walk about the adjacent ring gear 51 and thereby modify the rotational speed of the planet gears 34, which drive shaft 38 to supply power to the ring gear 71 at output differential gear train 59.

Figure 5:
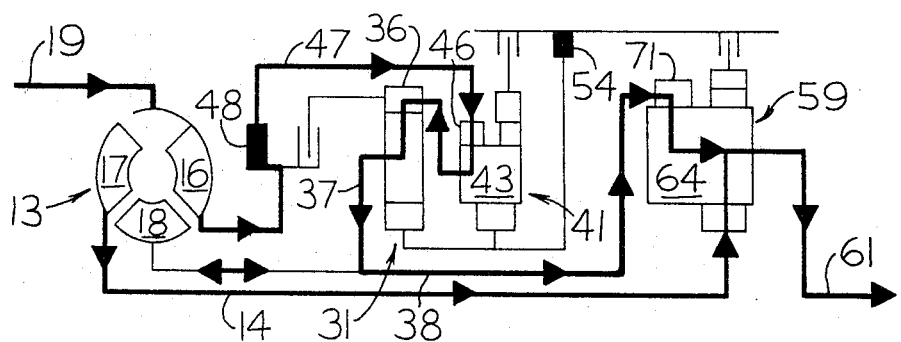

To realize the fourth forward speed, clutch 48 and brake 54 are applied to establish still another variation of the power path which supplements the fluid drive path through turbine output shaft 14. Under this condition, illustrated in FIG. 5, power is transmitted from pump 16 to member 47 through the ring gear 46 and planet gears 43 of the gear set 41 to the ring gear 36 and planet carrier 37 of the gear set 31. Through shaft 38, planet carrier 37 drives the ring gear 71 of the output differential gear train 59. The higher speed differential at this gear setting results in that the angular motion of the planets 64 which drive output shaft 61 are influenced by the increased rotary speed of the associated ring gear 71.

Figure 6:
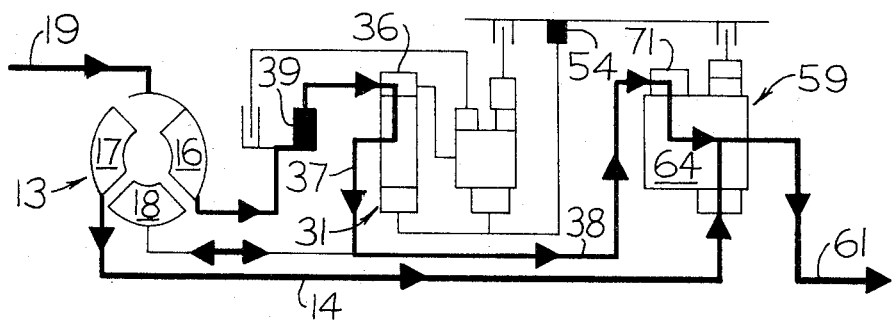

The fifth forward speed is realized by engaging clutch 39 and brake 54, as shown in FIG. 6. Under this condition, the fluid drive power path through converter 13, turbine output shaft 14, and output planetary train 59 combines with a power path from the transmission input 19 to ring gear 36 of first gear set 31. The planet carrier 37 of first gear set 31 then drives ring gear 71 of the output planetary train through shaft 38 at a greater rate than was realized in the fourth forward speed.

Figure 7:
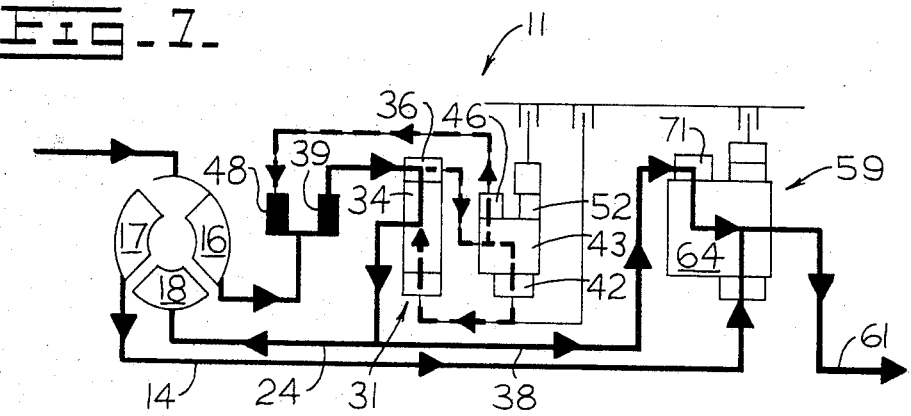
Figure 8:
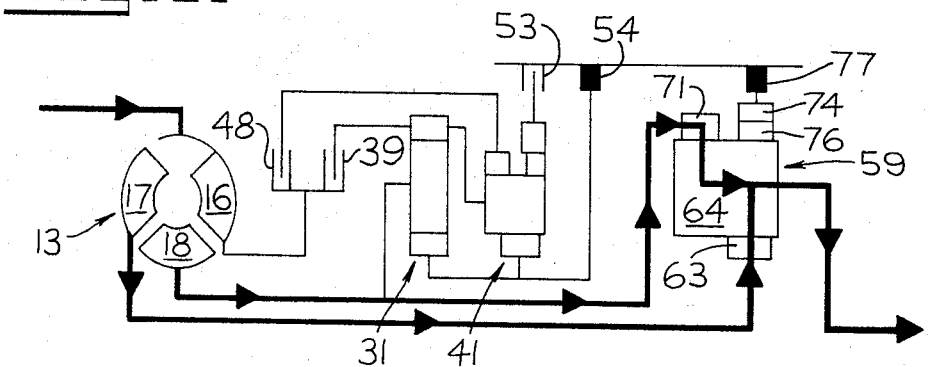

Referring now to FIG. 7, the sixth or highest forward speed is obtained by engaging both clutches 39 and 48. This provides a direct drive through the transmission 11 by locking ring gears 36 and 46 for synchronous rotation. Planets 34 then rotate the ring gear 71 of the output planetary train 59, through shaft 38, at engine speed; and through the reaction realized through turbine output shaft 14, the angular motion of the planets 64 of the output train is increased to effect still another increase in speed at the output 61 of the transmission. It may be seen that the coupling of these two clutches 39 and 48 results in a recirculating power path when the speed of planets 43 rotating upon the free-turning sun gear 42, within idler gears 52, reaches a coupling point. In sixth gear the torque on clutch 39 is greater than input torque, but the excess is cancelled by an opposing torque on clutch 48.

As described above, the several forward speeds are obtained through the cyclic characteristics of differential gear sets 31 and 41 in conjunction with the two torque inputs to the output differential gear train 59 at the sun gear 63 and ring gear 71 thereof. For reverse drive, brake 77 is engaged together with brake 54. Under this condition, planet gears 64 and the associated idlers 76 rotate within the ring gear 74 through the action of only the turbine 17 and reactor 18 of converter 13. Brake 54 is engaged at this time, rather than the other clutches and brakes 39, 48 and 53, since it provides a positive drive with much less relative speed than would result from the use of the other clutches or brakes. Reverse drive might also be produced by the engagement of brake 77 alone. However, it is preferable to also engage brake 54 to minimize the relative rotational speeds of the components of the planetary system.

It will be apparent that many variations may be made within the scope of the invention, and it is not intended to limit the invention except as defined in the following claims.

What is claimed is:

1. A power transmission for coupling driving and driven members comprising:
   a torque converter having a pump coupled to said driving member and having a turbine and a reactor;
   an output differential gear train operatively coupled to said driven member and having a first power input means coupled to said turbine and having a second power input means coupled to said reactor;
   a stepped speed ratio gearing system having a first and second torque input and having an output coupled to said reactor and said second power input means of said output differential gear train, wherein said stepped gearing system has first and second planetary gear sets and a first brake operative upon an element of said planetary gear sets for selectively changing the speed ratio therethrough, and first and second drive conditioning devices coupled between said driving member and said first and second torque inputs respectively of said stepped gearing system for selectively transmitting torque from said driving member to said first and second torque inputs.

2. The combination defined in claim 1 further comprising:
   a second brake operative upon a second element of said planetary gear sets for providing additional power paths therethrough.

3. The combination defined in claim 1 wherein said stepped gearing system is comprised of first and second planetary gear sets each having a sun gear and a planetary gear and carrier therefor and a ring gear, the planetary gear carrier of a first of said gear sets being said output of said stepped gearing system and the planetary gear carrier of the second of said sets being coupled to the ring gear of said first set and to said driving member through said first drive conditioning device to form said first torque input, the ring gear of said second set being coupled to said driving member through said second drive conditioning device to form said second torque input, the sun gears of said first and second gear sets being coupled together for synchronous rotation.

4. The combination defined in claim 3 wherein said second planetary gear set is of the compound type having a second ring gear, further comprising:
   a first brake operative upon said second ring gear of said second planetary gear set, and a second brake operative upon said coupled sun gears of said first and second planetary gear sets.

5. In a transmission having driving and driven members, the combination comprising:
   a torque converter having a pump coupled to said driving member and having a turbine and a reactor;
   an output differential gear train of the compound type having a sun gear coupled to said turbine and having a planetary gear carrier coupled to said driven member and having first and second ring gears;
   a stepped gearing system having first and second differential gear sets each having a sun gear, a planetary gear carrier, and a ring gear with said second gear set being of the compound type and having an additional ring gear, said sun gears of said first and second gear sets being coupled together for synchronous rotation, the planetary gear carrier of said first gear set being coupled to said reactor and to said first ring gear of said output differential gear train, the planetary gear carrier of said second gear set being coupled to the ring gear of said first gear set;
   a first clutch for selectively coupling the ring gear of said first gear set to said driving member;
   a second clutch for selectively coupling the first ring gear of said second gear set to said driving member;
   a first brake selectively operative upon said additional ring gear of said second gear set;
   a second brake operative upon said sun gears of said first and second gear sets; and
   a third brake operative upon said second ring gear of said output differential gear train.

6. The combination defined in claim 5 wherein said first and second clutches are coupled to said driving member through a common shaft.

7. The combination defined in claim 5 wherein said converter is situated at a forward end of said transmission with said first and second clutches and said first and second planetary gear sets and said output differential gear train being coaxial therewith and situated at progressively greater distances therefrom, said converter turbine being coupled to said output planetary gear train through a first shaft which extends along the axis of said elements, and wherein said converter reactor is coupled to said planetary gear carrier of said first gear set and to said ring gear of said output differential gear train through a cylindrical second shaft which extends therebetween and which is coaxial with said turbine output shaft, and wherein said first and second clutches are both coupled to said driving member through a cylindrical third shaft extending between said converter pump and said clutches in coaxial relationship with said first and second shafts, said second clutch being coupled to said ring gear of said first planetary gear set through a first annular member which is coaxial with said shafts, and said first clutch being coupled to said ring gear of said second planetary gear set through a second annular member which is coaxial with said first annular member and of greater diameter.

References Cited
UNITED STATES PATENTS

| | | | |
|---|---|---|---|
| 2,519,022 | 8/1950 | Burtnett | 74—688 |
| 2,572,007 | 10/1951 | Burtnett | 74—688 X |
| 2,893,265 | 7/1959 | Burtnett | 74—688 X |
| 3,000,234 | 9/1961 | Burtnett | 74—688 |
| 3,020,781 | 2/1962 | Burtnett | 74—688 |
| 3,354,747 | 11/1967 | Hobbs | 74—688 |

DONLEY J. STOCKING, *Primary Examiner.*
THOMAS C. PERRY, *Assistant Examiner.*

U.S. Cl. X.R.

74—688

PO-1050
(5/69)

UNITED STATES PATENT OFFICE
CERTIFICATE OF CORRECTION

Patent No. 3,440,901                Dated April 29, 1969

Inventor(s)  ROBERT O. CHAMBERS

It is certified that error appears in the above-identified patent and that said Letters Patent are hereby corrected as shown below:

Column 2, line 56, "downwardly" should read --forwardly--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents